Patented Dec. 9, 1952

2,621,184

UNITED STATES PATENT OFFICE 2,621,184

NONSTAIN HECTOGRAPH COLORS

Roy Clifford Locke, Salem, N. J., assignor to E. I. du Pont de Nemours and Company, Wilmington, Del., a corporation of Delaware No Drawing. Application September 26, 1949, Serial No. 117,929

6 Claims. (Cl. 260—267)

This invention relates to novel organic coloring compounds. More particularly, this invention deals with new and improved reddish-blue to red coloring matters for hectograph carbon paper and similar purposes.

It is an object of this invention to produce novel coloring matters for hectograph purposes which shall possess the following qualifications: (1) reddish-blue to red in color, (2) sufficient solubility in alcoholic solvents to enable their use in spirit hectograph and related processes, and (3) an improved non-staining quality. Additional objects will appear as the description proceeds.

With respect to the third qualification above, it may be explained that present-day purple hectograph inks, which generally employ crystal violet (Color Index No. 681) as principal color, have a particularly objectionable quality of staining readily and tenaciously the hands of those who manufacture the hectograph paper or who handle it at any stage up to its ultimate uses in the hectograph pad. These stains are objectionable not only because of the ease and intensity which which they go upon the tissue of the human skin, but even more so because of the tenacity with which they hang on. Soap and water do not readily remove such stains; sometimes it requires bleach or other chemical treatments.

This application is a continuation-in-part of my copending application, Serial No. 582,789, filed March 14, 1945 (Patent No. 2,492,163, issued December 27, 1949). In the said parent application I have shown that basic dyes containing at least two primary amino groups and which are free of water-solubilizing groups will react with other basic dyes which are free of water-solubilizing groups to produce novel chemical compounds which are less soluble in water than the original parent materials and which are adapted for use as colors for hectograph coatings and typewriter ribbon. A particular practical advantage of the novel coloring compounds is their property of exhausting evenly on the hectograph pad; that is, the color of the numerous prints produced from a master copy does not alter as the number of prints made increases.

As illustrations of basic dyes of the first-mentioned group, which I designated as the precipitant color, I mentioned there Chrysoidine GN (Color Index No. 20) Basic Brown BR (Color Index No. 332), fuchsine (also known as magenta), safranine and phosphine. The second group of basic dye, which I called the precipitable dye, was defined as a dye of the following basic-dye subclasses: diaryl-methanes, triaryl-methanes, ketonimines, xanthenes, acridines and thiazoles.

Reaction is generally effected by mixing saturated or nearly saturated aqueous solutions of the two types of basic colors in such proportions that the total content of basic dye of the second group is stoichiometrically equal to the total basic dye of the first group. For this purpose, stoichiometric proportions is defined as implying 1 molecule of the dye of the precipitable color for each two primary amino groups in the precipitant. It is clear from this definition that the precipitable color should preferably be free of primary amino groups.

As evidence that a true chemical reaction occurs, as distinguished from a mere physical admixture, the following facts concerning the reaction or the products thereof are mentioned.

1. The resulting product is less soluble in water than the individual components thereof.

2. The precipitated product is more soluble in alcohol than would be expected from a mixture of the initial components.

3. The reaction apparently proceeds according to the stoichiometric laws. Thus, if the product is ground to a fine dust and then blown onto a white sheet of paper moistened with alcohol, a colored spot is formed on the sheet. If the reaction has been effected between stoichiometric proportions as hereinabove defined, the color of the spot is uniform throughout and has a sharp outline. But if an excess of one of the components has been employed, its shade, which is generally different from the shade of the precipitated product, bleeds into the surrounding areas, producing a colored halo around the intensely colored spot.

4. If the aforementioned precipitate is incorporated in alcohol, castor oil, beeswax, or other similar fatty or waxy composition for the purpose of producing a spirit printing ink, a typewriter ribbon saturating ink or a coating for carbon paper, the "working properties" of the ink are not so adversely affected as when a mechanical mixture of the same initial dyes is incorporated in the same fatty or waxy material in the same proportions.

5. When the aqueous solutions of the component dyes are mixed, the pH of the aqueous phase drops after precipitation has occurred, indicating an increase in free acid. This is to be explained by the presumption that the component dyes have reacted, splitting off at least part of the inorganic acids which originally formed salts with the respective initial dyes.

Incidentally, the new compounds are recoverable in a state of purity much higher than the initial dyes from which they are formed, and are in particular substantially free of inorganic salts. This factor by itself is of tremendous significance, inasmuch as basic dyes, by virtue of their high water-solubility, are generally contaminated with considerable quantities of electrolytes. The latter have an adverse effect on the working properties of the color when incorporated into organic vehicles, and often cause the mass to gel so badly that it can no longer be worked.

The claims of my said parent application are limited to the production of a black resultant color. This can be achieved by the employment of a yellow or brown precipitant (e. g. chrysoidine or basic brown). For the preparation of colors within the range of reddish-blue to red, a red precipitant must be employed, for instance magenta, safranine or phosphine, and the precipitable color is to be selected from the group consisting of the polyaryl-methanes and xanthenes.

In addition, the composition may contain for shading purposes, a third component which may now be selected from a much wider field, namely the group of basic colors consisting of the polyaryl-methanes, ketonimines, xanthenes, acridines and thiazoles, which are free of sulfo, carboxy and primary amino groups.

Now, I have found that when reddish-blue to red colors are produced according to my invention, they not only possess the aforementioned good quality of uniform exhaustion, but they have surprisingly the additional and much-sought-after property of not dyeing the hands of those who must come in contact with the hectograph materials. The new colors exhibit no strong tendency to color the human skin, and whatever stain develops on one's fingers from physical contact with the color washes off readily by the aid of soap and water. In addition, the colored reaction products possess all the other good qualities and advantages mentioned in connection with these new products in my parent application, such as improved solubility in organic solvents, increased copy power in hectograph work, improved viscosity and heat-stability, and the opening up for hectograph use or in the spirit printing art a larger field of dyes than was available heretofore.

Without limiting my invention to any particular procedure, the following examples will serve to illustrate my preferred mode of operation. Parts mentioned are by weight.

*Example 1*

Solution A:
113 parts of magenta, 92% pure (approximately 0.334 mol., C. I. 677) 2000 parts of water at 75° F.

Solution B:
165 parts of crystal violet, 93% pure (approximately 0.375 mol., C. I. 681) 75 parts of Victoria Blue B Conc. 84% pure (approximately 0.125 mol., C. I. 729) 1500 parts of water at 75° F.

In each case, add the dye to the water with good agitation. Heat to 180° F. to completely dissolve the dye.

Add solution A to solution B at 180° F. Continue stirring at 180° F. for 15 minutes. Shut off heat and allow to stand until cool or until the color settles to the bottom of the precipitation vessel.

At 180° F., the precipitate is colloidal. It has a bronze cast which is shown by spotting the slurry on filter paper. The center of the spot consists of a lustrous bronzy purple precipitate which is surrounded by a clear rim of liquid. If one type of dye is present in excess it bleeds into this outer rim.

To recover the settled precipitate, draw off the aqueous liquor. Slowly heat the segregated color mass to 140° F. to form a melt, as is customary in isolating many basic dyes on a commercial scale. Run the melt into glazed porcelain drying pans. Dry in an oven at 150° F., turning after 24 hours intervals to speed drying. Cool and grind the product to about 60 mesh fineness. A violet precipitate, having excellent solubility in spirit solvents (e. g. alcohols, ethers or esters) is obtained.

As an alternative method of recovery, the above colloidal system may be cooled with agitation and then filtered in the usual manner. The preferred method of isolation selected will depend on the type of equipment available.

The isolated product shows less solubility in water and a greater rate and degree of solubility in alcohol than the mechanically mixed constituents. When the powder is blown on a sheet of filter paper moistened with alcohol a uniform purple stain is seen, contrasted with the multi-colored spots of a mechanical mixture.

When incorporated in the usual carnauba wax-mineral oil combinations used for coating hectograph carbon paper, this product has practically no tendency to stain the skin throughout the general handling operations in the preparation of the ink and in the subsequent copy operations. When contacted with the skin, it can be easily removed by normal washing with soap and water whereas present-day hectograph inks, containing uncombined crystal violet will under the same conditions, cause a deep stain in the skin which is removable only under the most severe conditions.

A suitable criterion for the measurement of the staining tendency of these purple compounds can be obtained from the following accelerated test: A strip of the principal carbon sheet is attached to a sheet of white alpha cellulose paper which, in turn, is firmly attached to a cardboard strip that is water-repellent. Water is then gently flowed over the surface of the purple carbon strip and allowed to flow down over the alpha cellulose sheet. The degree of resistance of the dye to stain the alpha cellulose sheet may be interpreted directly as its resistance to stain the skin during the general handling operations in the spirit hectograph processes for copy printing.

The higher chemical purity and the generally superior working properties in carbon coating systems distinguish further this compound over the mechanical mixtures of the prior art.

This dye compound can be substituted on an equal weight basis for the present crystal violet in wax-oil media with equally as low a viscosity, ease of grinding, application to the carrier sheet, heat stability, copy power, etc.

*Example 2*

Procedure and composition are similar to Example 1, except substitute 202 parts of Safranine T, 90% pure (approximately 0.5 mol., C. I. No. 841) for the magenta, to form solution A.

Example 3

Solution A:
  208 parts of Phosphine 2G, 87% pure (approximately 0.5 mol., C. I. No. 794)
  2000 parts of water at 75° F.
Solution B:
  218 parts of crystal violet, 93% pure (approximately 0.5 mol)
  1500 parts of water at 75° F.

The procedure is the same as in Example 1.

A red shade of purple is obtained which possesses the non-stain tendency described above and possesses superior working properties to the mechanical mixtures of the prior art, containing tannic acid, when used in wax-oil media to form spirit hectograph coating compositions.

Example 4

The procedure and composition are similar to Example 1, except that 300 parts of Victoria Blue B concentrated, 84% pure (approximately 0.5 mol), and no crystal violet, were used to form solution B.

The blue violet shade thus obtained has practically no tendency to stain the skin according to the accelerated test outlined above. In this respect it is a great improvement over the conventional purples as represented by crystal violet. Its high order of solubility in alcohol makes it useful as a desirable color in the spirit hectograph processes for copy printing.

A great improvement is shown by this product in its general working properties in wax-oil media when compared on an equal weight basis against the prior art mechanical mixtures of the crystal violet hydrochloride with tannic acid. For instance, the viscosity of the ink is lower, the rate of melt-down is more rapid, there is no tendency for the dye to granulate as is highly evident with the use of the tannin-dye compositions, the application to the carrier sheet is much easier and the color value is much greater, as evidenced by the extended durability in the spirit copy printing operation.

Since the precipitant in this case is inherently a dye compound, the ultimate composition does not suffer the dilution effect and loss of color value as is the case with the prior art compositions composed of tannic acid and basic dye.

Example 5

The procedure and composition are as in Example 1, except use 109 parts of Lithosol Blue 6G, 92% pure (approximately 0.25 mol, C. I. No. 658) and 81 parts Basic Orange 3RN, 92.7% pure (approximately 0.25 mol, C. I. No. 788) to form solution B.

The red violet shade thus produced is much superior to mechanical mixtures of the respective standard dyes in that the viscosity is lower, the heat stability is more uniform, the application to the carrier sheet is easier, the shade is much more uniform in the copy operation and the strength is much greater throughout the copy operation.

Example 6

The procedure is the same as in Example 1, except substitute 47 parts of Rhodamine 5GDN, 96% pure (approximately 0.1 Mol, C. I. No. 752) and 240 parts of Victoria Blue B, 86% pure (approximately 0.4 mol) to form solution B.

The same advantages of lower viscosity of the carbon ink, easier application to the carrier sheet, greater copy value and a non-staining tendency when contacted with the skin are attained in this example over the prior art compositions containing tannic acid.

Example 7

The procedure and composition are similar to Example 1, except substitute 250 parts of Rhodamine 5GDN, 97% pure (approximately 0.5 mol) for the other dyes to form solution B.

The blue-red thus formed is distinguished over the magenta formerly used for such color, by its greatly reduced tendency to stain the skin and by possessing superior working properties (low viscosity, better coating properties, etc.) in wax-oil media. In the spirit hectograph processes of copy printing, the above product has a more desirably yellow red shade than magenta and gives a superior copy clarity and durability throughout an extended number of copies.

The following additional examples will serve to illustrate the mode of incorporating my novel purple coloring matters in various waxes or organic solvents to produce various coating compositions for practical purposes:

Example 8.—Hectograph paper 11.0 parts of carnauba wax
31.0 parts of mineral oil
58.0 parts of the product of Example 1

Mix the above components and heat to melt the wax. Grind by passing 6 times over a three-roll ink mill. Remelt and coat on a carrier sheet.

The purple hectograph paper thus obtained does not stain the hands during general handling operations in the spirit hectograph processes for copy printing. A vigorous rubbing of the hands over the face of the carbon causes only a slight "crocking-off" on the skin. This is easily removed by washing the hands normally with soap and water. It does not leave a deep-set stain in the skin as is the case when the current crystal violet is formulated under identical conditions.

Example 9.—Typewriter ribbon 41.7 parts of the product of Example 1
27.5 parts of castor oil (refined)
10.0 parts of mineral oil (SAE 20)
20.3 parts of lard oil Mix the color in the oils and grind by passing 6 times over a three roll ink mill. Impregnate the batiste cloth carrier ribbon and squeeze practically dry to touch.

The purple hectograph copy ribbon thus obtained does not leave an unsightly deep-set stain on the skin of the hands during the general handling operations and possesses the same general order of superiority over the mechanical mixtures of the prior art products as pointed out above.

Example 10.—Spirit printing ink 25.0 parts of methyl acetate
45.0 parts of ethyl alcohol
15.0 parts of methyl cellulose (Reigel, Ind. Chem., p. 467)
12.0 parts of acetone
3.0 parts of the product of Example 1

Dissolve the dye in the mixed solvent at 75° F.

The resulting solution may be used as a spirit printing ink or as a surface stain on wood, leather, paper, textiles, etc., to give a color of greater resistance to water bleeding than is given by the parent dye constituents.

Other uses include the production of hectograph stamping inks and writing inks which may be made by incorporating my new non-stain purples in suitable media.

In the preparation of spirit printing inks and stains from my novel coloring matters, any of the customary solvents may be employed. Binders may be used if necessary.

Other variations in detail in the practice of my invention will be readily apparent to those skilled in the art.

It will be noted that in those examples above which employ magenta as reactant (Examples 1, 4, 5, 6 and 7), 1/3 mole of magenta was reacted with a total of 1/2 mole of the other colors named in the example. This agrees with the definition of stoichiometric proportions indicated hereinabove, inasmuch as magenta has 3 reactive amino groups per molecule.

I claim as my invention:

1. A reddish-blue to red organic coloring matter in solid form comprising a water-insoluble reaction product of at least one water-soluble basic color possessing primary amino groups and being selected from a first group consisting of magenta, safranine and phosphine, with at least one reddish-blue to greenish-blue water-soluble basic color of a second group consisting of the polyaryl-methanes and xanthenes, and at least one water-soluble basic color of a third group consisting of the polyaryl-methanes, ketonimines, xanthenes, acridines and thiazoles, the colors selected from said second and third groups being different from each other, and being free of sulfo, carboxy and primary amino groups, the joint quantity of color selected from said second and third groups being stoichiometrically equal to the quantity of color selected from the first group and being chemically combined therewith, and the quantity of color from said second group being at least equal in moles to that of the color from said third group, the entire composition being substantially free of unreacted residues of any of the component colors.

2. A reddish-blue to bluish red organic coloring composition adapted for use as coloring matter in hectograph carbon paper, comprising the water-insoluble reaction product of magenta, crystal violet and Victoria blue, the quantity of Victoria blue being less on a molal basis than the quantity of crystal violet, and the joint quantity of the two being stoichiometrically equal to the quantity of magenta, the entire composition being substantially free of unreacted residues of any of the component colors.

3. A reddish-blue to bluish red organic coloring composition adapted for use as coloring matter in hectograph carbon paper, comprising the water-insoluble reaction product of 1/3 mole of magenta with 3/8 moles of crystal violet and 1/8 mole of Victoria blue, the entire composition being substantially free of unreacted residues of any of the component colors.

4. A reddish-blue to bluish red organic coloring composition adapted for use as coloring matter in hectograph carbon paper, comprising the water-insoluble reaction product of crystal violet and Victoria blue with the safranine color listed as No. 841 in the Color Index, the quantity of crystal violet being larger in moles than that of Victoria blue, and the joint quantity of the two being stoichiometrically equal to the quantity of said safranine color, the entire composition being substantially free of unreacted residues of any of the component colors.

5. A reddish-blue to bluish red organic coloring composition adapted for use as coloring matter in hectograph carbon paper, comprising the water-insoluble reaction product of magenta with the triphenyl-methane color listed as No. 658 in the Color Index and the acridine color listed as No. 788 in the same index, the quantity of the triphenyl-methane color being substantially equal in moles to that of the acridine color, and the joint quantity of the two being stoichiometrically equal to the quantity of magenta, the entire composition being substantially free of unreacted residues of any of the component colors.

6. A reddish-blue to bluish red organic coloring composition adapted for use as coloring matter in hectograph carbon paper, comprising the water-insoluble reaction product of magenta with Victoria blue and the xanthene color listed as No. 752 in the Color Index, the quantity of Victoria blue being larger in moles than that of said xanthene color, and the joint quantity of the two being stoichiometrically equal to the quantity of magenta, the entire composition being substantially free of unreacted residues of any of the component colors.

ROY CLIFFORD LOCKE.

No references cited.